US006672017B2

(12) United States Patent
Larson (10) Patent No.: US 6,672,017 B2
(45) Date of Patent: Jan. 6, 2004

(54) COLUMN PROTECTOR

(76) Inventor: Daniel L. Larson, 50 Wildflower Way, North Oaks, MN (US) 55127

( * ) Notice: Subject to any disclaimer, the term of this patent is extended or adjusted under 35 U.S.C. 154(b) by 15 days.

(21) Appl. No.: 10/154,521

(22) Filed: May 23, 2002

(65) Prior Publication Data

US 2003/0217526 A1 Nov. 27, 2003

(51) Int. Cl.[7] .............................................. E02D 27/42
(52) U.S. Cl. ........................ 52/170; 52/292; 52/736.1; 52/297; 248/519; 256/65.14
(58) Field of Search ................. 52/170, 736.3, 52/736.4, 298, 244, 292, 736.1, 732.5; 248/677, 188.8, 188.9, 519; 256/65.14, 59; 211/189, 190, 191

(56) References Cited

U.S. PATENT DOCUMENTS

| | | | | | |
|---|---|---|---|---|---|
| 3,026,161 | A | * | 3/1962 | Mickelson | .................... 403/71 |
| 4,838,440 | A | * | 6/1989 | Thompson | .................... 248/188 |
| 4,892,978 | A | * | 1/1990 | Axworthy | .................... 174/38 |
| 5,369,925 | A | * | 12/1994 | Vargo | .......................... 52/244 |
| 6,257,557 | B1 | * | 7/2001 | Anderson et al. | .............. 256/1 |
| 6,336,620 | B1 | * | 1/2002 | Belli | .......................... 248/519 |
| 6,588,717 | B2 | * | 7/2003 | Carnahan et al. | ........ 248/188.8 |

* cited by examiner

Primary Examiner—Carl D. Friedman
Assistant Examiner—Nahid Amiri
(74) Attorney, Agent, or Firm—Kinney & Lange, P.A.

(57) ABSTRACT

A column protector for positioning at a base of a warehouse rack column to protect the column from damage caused by a forklift. The column protector includes a collar and a foot. The collar and the foot form a device that protects columns of a rack systems from forklift impact.

22 Claims, 8 Drawing Sheets

COLUMN PROTECTOR

BACKGROUND OF THE INVENTION

The present invention pertains to an apparatus for protecting pallet racking columns. More particularly, the invention pertains to an apparatus that protects the front column of a pallet rack frames against damage caused by a forklift.

Many operations in warehouses and manufacturing plants require the use of forklift equipment for handling inventory and products. Operation of forklift equipment in facilities having pallet racking presents a significant safety concern.

A common forklift used today is a reach truck. A reach truck with a load weighs approximately 6000 to 8000 pounds. Reach trucks have straddles located near the bottom of the truck on both the right and left sides. The straddles carry and support the lift and reach mechanism of the truck. Standard operating procedures for reach trucks require the truck to approach the front of the pallet rack with the straddles. This approach positions the truck to allow the cycle of the reach mechanism carriage to deposit or retrieve pallets from the racking unit. In order for the truck to deposit or retrieve pallets, the straddles must be within three inches of the front of the column of the rack. Should the truck operator impact the column in error, considerable damage may occur to the rack. If damage occurs to the frame column of the rack unit, the entire rack unit must be emptied in order for repairs to be made. Therefore, various devices have attempted to provide a means for protecting the rack against forklift damage.

One method used to limit structural damage is to place steel fabricated protectors around the columns of the racking system. The steel protectors, however, have proven to be ineffective against the impact of a 6000 to 8000 pound forklift.

A simple technique to protect the columns of racking systems against forklift damage is presently not available. The present invention is directed at a simple apparatus to protect the front columns of racking units against forklift damage.

BRIEF SUMMARY OF THE INVENTION

The invention is a column protector for positioning at a base of a warehouse rack columns to protect a column of the racking system from damage caused by forklifts. The column protector includes a collar and a foot. The collar is attached to the foot such that the collar sits higher than the foot. The collar has three sides that wrap around a rack column.

The foot includes a left side, a front and a right side that are ramped to cushion forklift impact. The foot also includes a left back side and a right back side that are ramped to cushion forklift load impact from the backside. The bottom of the foot includes a plurality of anchor reception openings, a first recessed portion and a second recessed portion. The anchor reception openings provide an opening to receive anchors to secure the column protector to a concrete floor. The first recessed portion allows the column protector to be mounted onto various seismic rack column foot plates. The second recessed portion allows the column protector to clear various seismic foot plate anchor locations.

DETAILED DESCRIPTION

Figure 1:
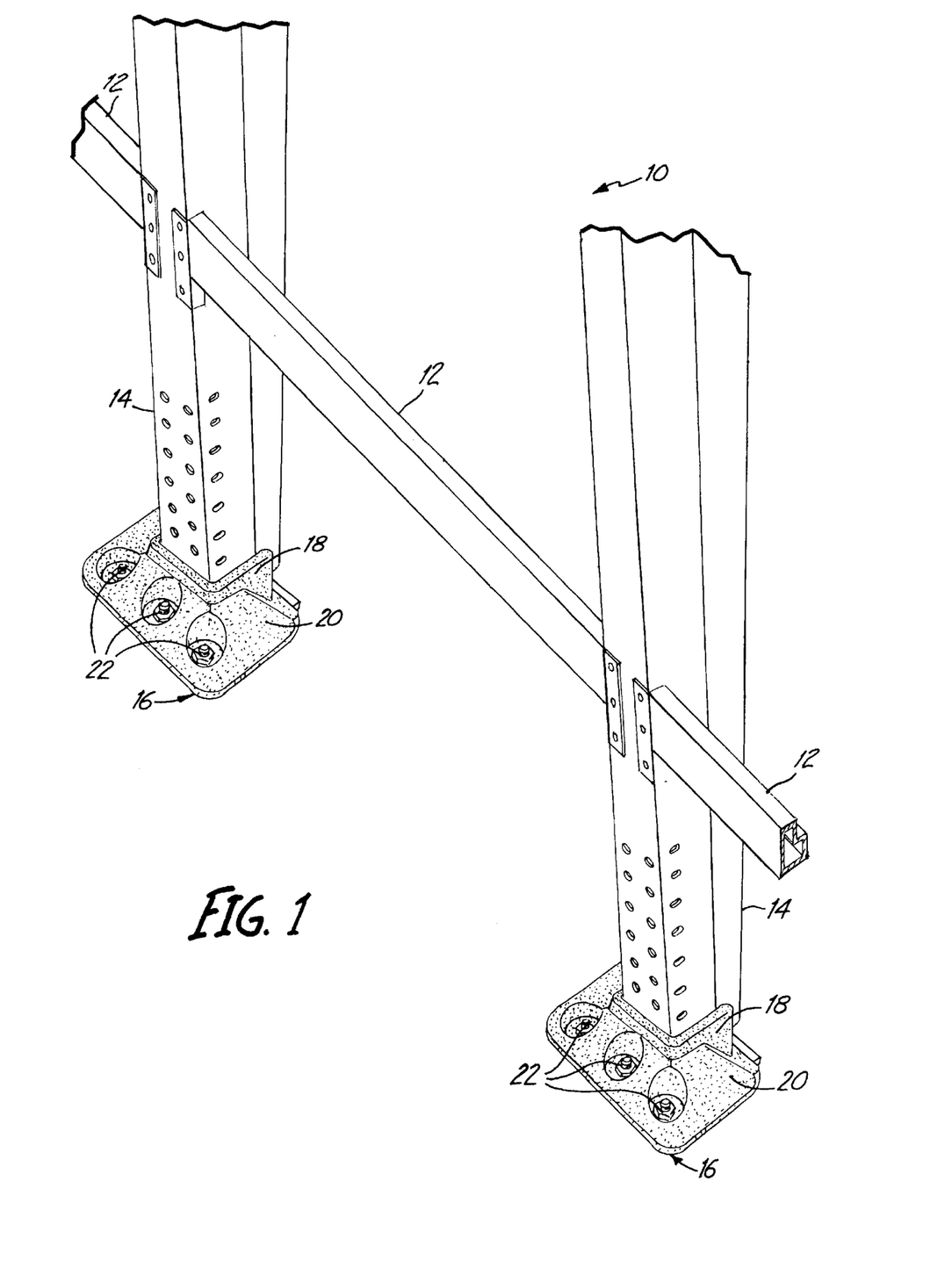
FIG. 1 is a perspective view of the end of a racking system with two mounted column protectors.

The present invention provides a device that protects the columns of warehouse racking systems from forklift damage. A typical warehouse racking system 10 along with two column protectors 16 are shown in FIG. 1. The racking system 10 typically includes beams 12 and columns 14. The beams 12 are used to support various warehouse items such as food, electronics or appliances. The columns 14 support the beams 12. Most columns 14 are of a rectangular or square cross section.

As illustrated in FIG. 1, the column protector 16 consists of a collar 18 and a foot 20. The collar 18 extends above the foot 20. A plurality of anchors 22 are used to secure the column protector 16 to a concrete floor. The rack frame column 14 is surrounded by the collar 18. The collar 18 wraps around the column 14 protecting three sides of the column 14 from forklift damage.

Figure 2:
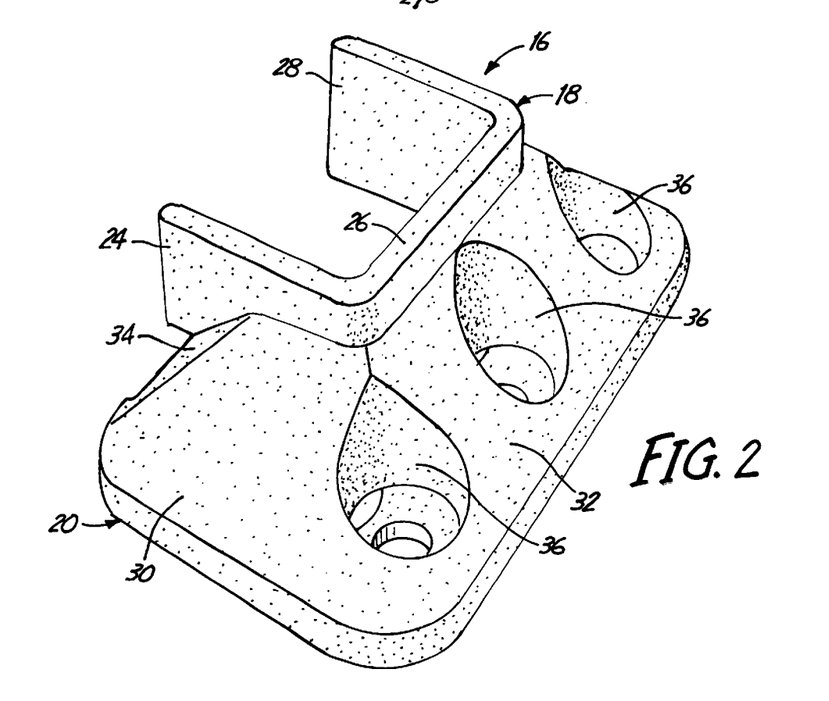
FIG. 2 is a top perspective view of the column protector.

FIG. 2 is a top perspective view of the column protector 16. The collar 18 has a first side 24, a second side 26 and a third side 28. The first side 24, the second side 26 and the third side 28 form a u-shape.

The foot 20 includes a left side 30, a right side (not shown in FIG. 2), a front 32, a left back side 34 and a right back side (not shown in FIG. 2). The left back side 34 and the right back side are ramped so that if a forklift operator accidently pulls a pallet into the back of the column protector 16, the left back side 34 and the right back side cause the forklift load to ride up and over the foot 20 preventing the load from immediately impacting the column 14.

The left side 30 is located to the left of the collar 18. The right side is located to the right of the collar 18. The front 32 is located forward of the collar 18. The left side 30, the front 32 and the right side are ramped so that if a forklift approaches the warehouse rack system 10 too closely, the ramped sides 30, 32 and right side will reduce impact on the column protector 16 and protect the racking system 10.

The front 32 includes a plurality of recessed pockets 36. FIG. 2 shows three recessed pockets 36 located forward of the sleeve portion 18. One of the recessed pockets 36 is located at a junction with the left side 30. The second recessed pocket 36 is located at a junction with the right side. The third recessed pocket 36 is located in the center of the front 32. The recessed pockets 36 protect the anchors used to secure the column protector 16 to the concrete floor. The anchors must be protected from forklift contact otherwise the forklift could shear off the anchors. Therefore, the recessed pockets 36 provide a cavity that prevents the forklift from directly contacting the anchors.

The collar 18 and the foot 20 are made of a ductile iron casting. If a forklift contacts the cast iron, scratches may occur but no structural damage will occur. A ductile iron casting will not be structurally damaged by direct forklift contact.

Figure 3:
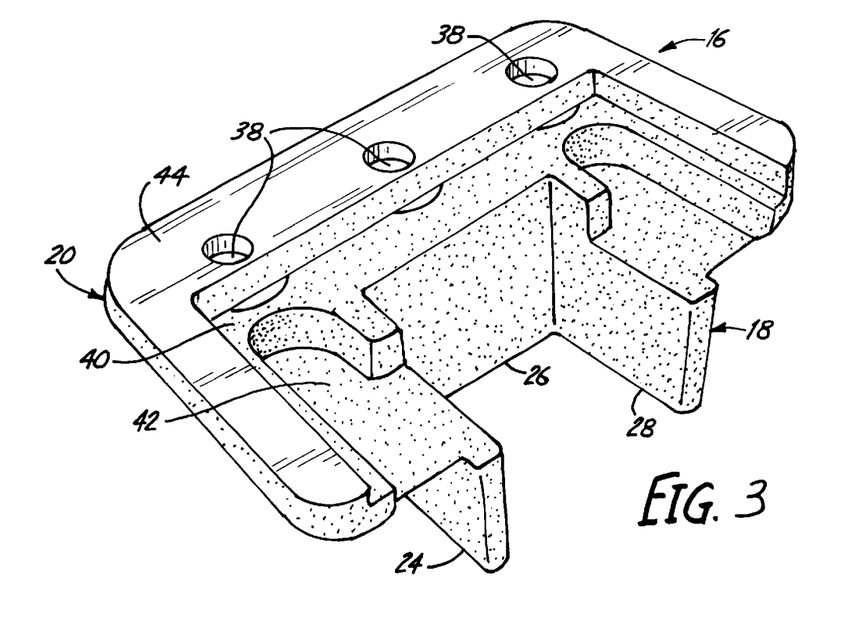
FIG. 3 is a bottom perspective view of the column protector.

FIG. 3 is a bottom perspective view of the collar 18 and the foot 20. The foot 20 includes a plurality of anchor reception openings 38, a first recessed portion 40 and a second recessed portion 42. The anchor reception openings 38 are aligned near an edge 44. The anchor reception openings 38 provide an opening to receive anchors to secure the column protector 16 to a concrete floor. To secure the column protector 16, anchors are drilled through the anchor reception openings 38 and into the concrete floor.

In the bottom perspective view shown in FIG. 3, the first recessed portion 40 is located lower than the anchor reception opening 38. The first recessed portion 40 allows the column protector 16 to be mounted over seismic rack foot plates on rack columns 14. The first recessed portion 40 is u-shaped to allow the column protector 16 to mount over seismic foot plates.

In the view shown in FIG. 3, the second recessed portion 42 is situated below the first recessed portion 40. The second recessed portion 42 allows the column protector 16 to clear anchor bolts patterns for seismic configured baseplates of racking columns 14. Seismic configured baseplates differ from standard baseplates in length, width, and thickness as well as in the amount of anchors required to secure the baseplate to the floor. Seismic baseplates are required to be used in warehouses located in areas prone to earthquakes, such as the east and west coasts of the United States. The seismic configured baseplates provide a more secure mounting to the floor so that racking systems 10 will not collapse during an earthquake.

Figure 4:
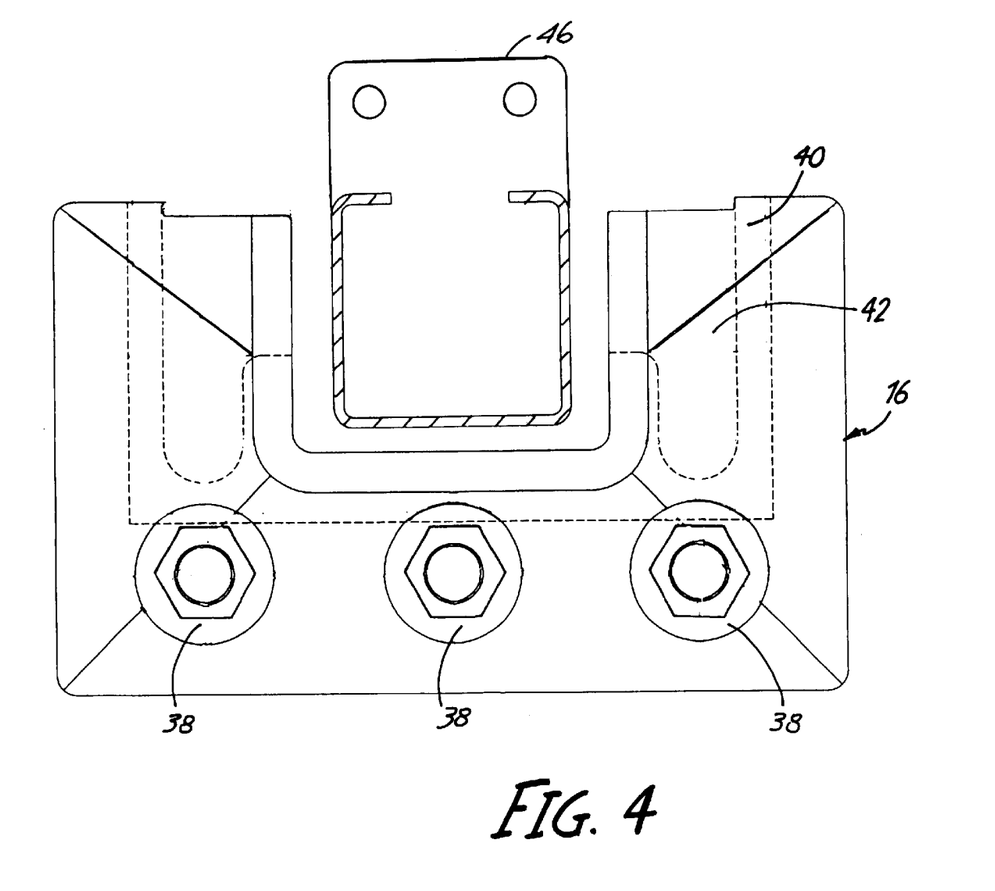
FIG. 4 is a top plan view of the column protector mounted to a rack column with a standard baseplate.

FIGS. 4–7 illustrate the versatility of the column protector 16. FIGS. 4–7 show the column protector 16 mounted to various column baseplates. FIG. 4 is a plan view of the column protector 16 mounted to a rack column with a standard baseplate 46.

Figure 5:
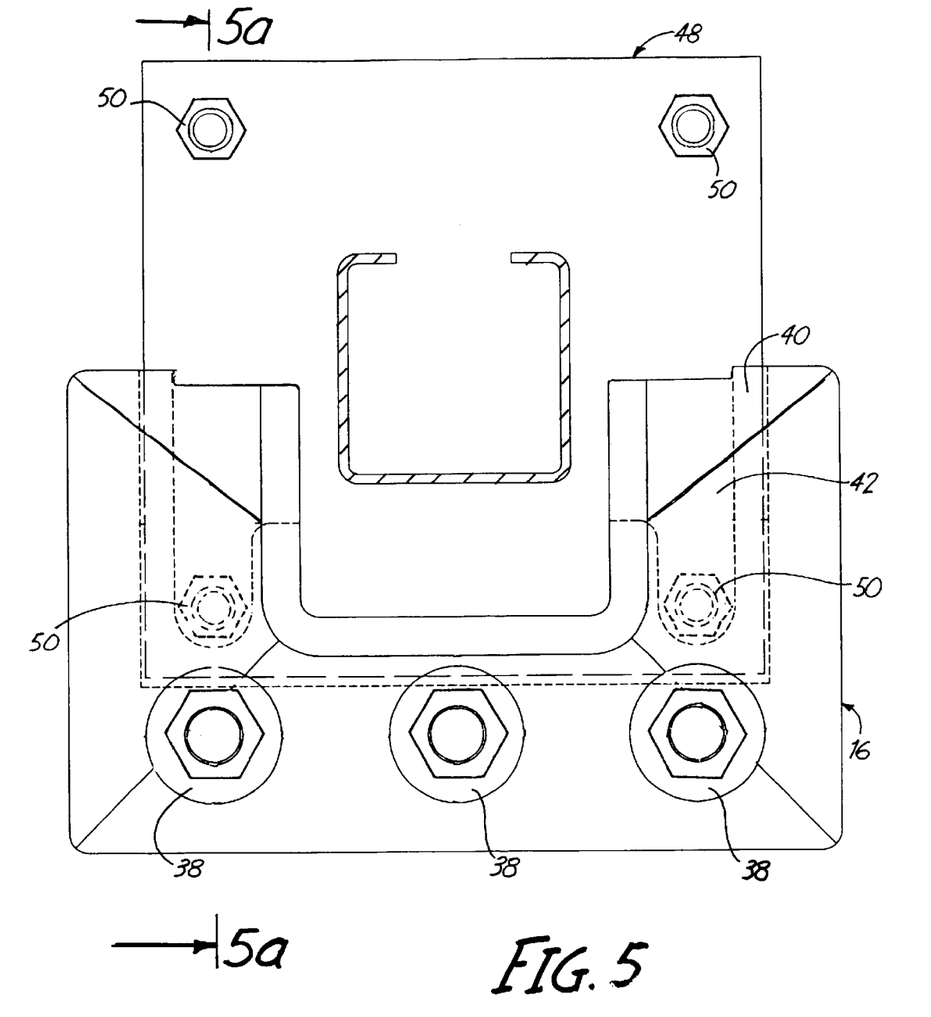
FIG. 5 is a top plan view of the column protector mounted to a rack column with a 8×8 seismic column baseplate.

FIG. 5 shows a plan view of the column protector 16 mounted onto a 8×8 seismic column baseplate 48. The 8×8 seismic column baseplate 48 is a half inch thick with a plurality of anchors 50 located in each of the four corners of the baseplate 48. The column protector 16 is mounted onto a portion of the seismic column baseplate 48 by sliding the column protector 16 over the front of the seismic column baseplate 48. When the column protector 16 is slid into place, the second recessed portion 42 provides a recess to receive the seismic baseplate anchors 50.

Figure 5A:
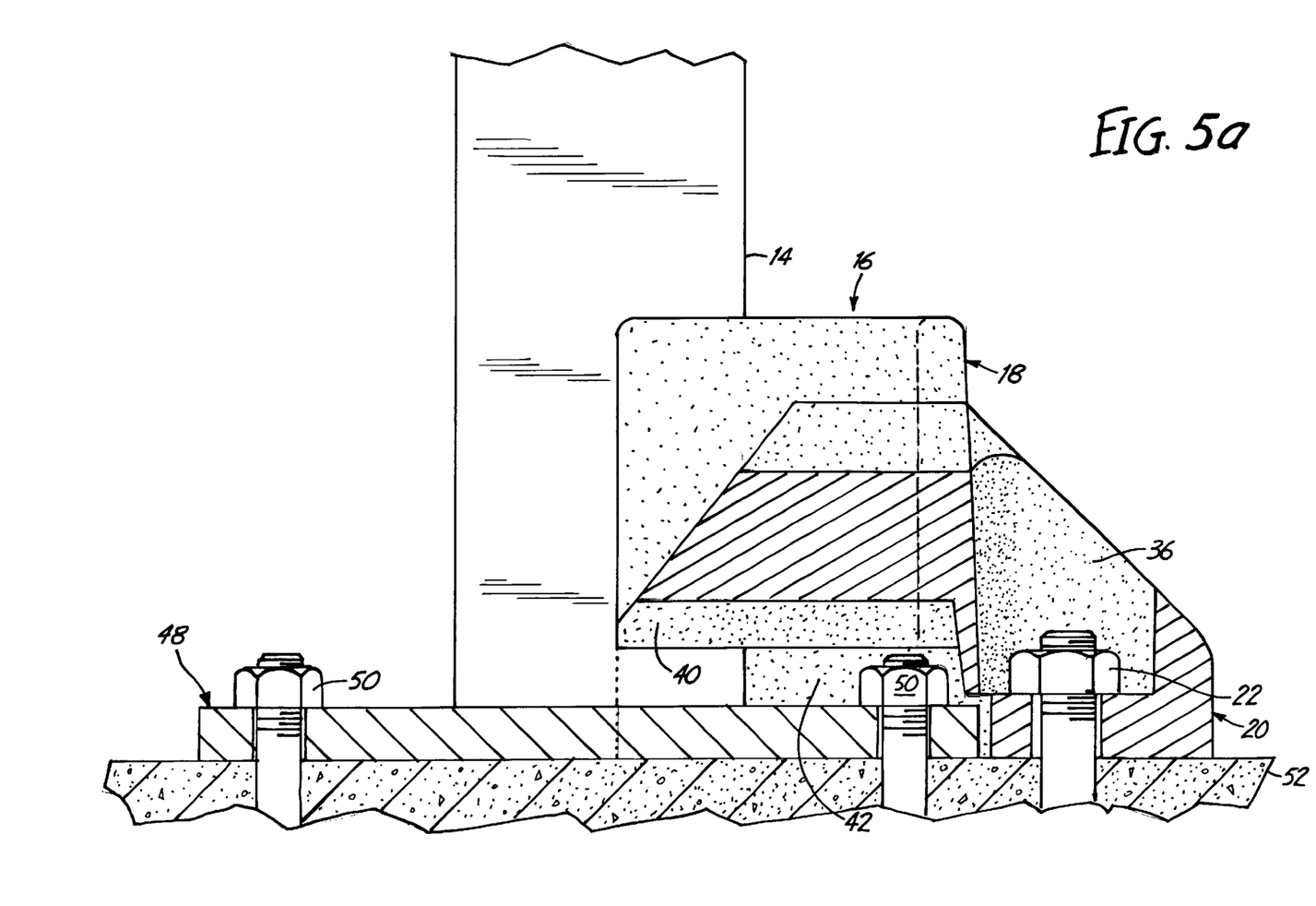
FIG. 5a is a sectional view through a column protector mounted to a rack column with a 8×8 seismic column baseplate.

FIG. 5a is a sectional view along section 5a—5a of FIG. 5, showing an anchor 22 and the column protector 16 mounted to a 8×8 seismic column baseplate 48. FIG. 5a shows a more detailed view of the mounting of the column protector 16 to a floor 52. The column 14 of the racking system 10 is inserted into the sleeve portion 18 of the column protector 16. Once the column 14 is inserted, the foot 20 protects the column 14 from forklift damage. To stabilize the column protector 16, the column protector 16 is secured to a floor 52 by a plurality of anchors 22. The anchors 22 are drilled through the anchor reception openings 38 and drilled into the concrete floor 52. Additional anchors 50 are added to increase the stability of the baseplate 48 during an earthquake.

Figure 6:
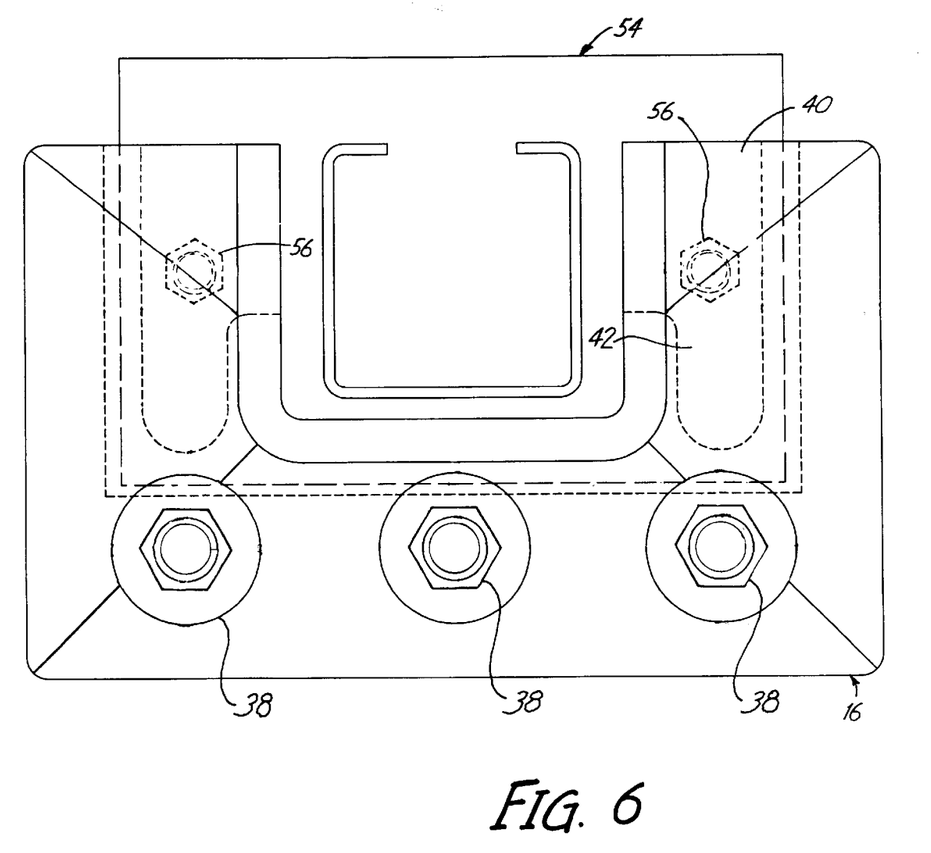
FIG. 6 is a top plan view of the bottom of a column protector mounted to a rack column with a 5×7 ¾ seismic column baseplate.

FIG. 6 shows a plan view of the column protector 16 mounted onto a 5×7 ¾ seismic column baseplate 54. The 5×7 ¾ seismic column baseplate 54 is ⅜ of an inch thick with anchors 56 secured to each side of the baseplate 54. The column protector 16 is mounted onto a portion of the seismic column baseplate 54 by sliding the column protector 16 over the front of the seismic column baseplate 54. When the column protector 16 is slid into place, the second recessed portion 42 provides a recess to receive the seismic baseplate anchors 56.

Figure 7:
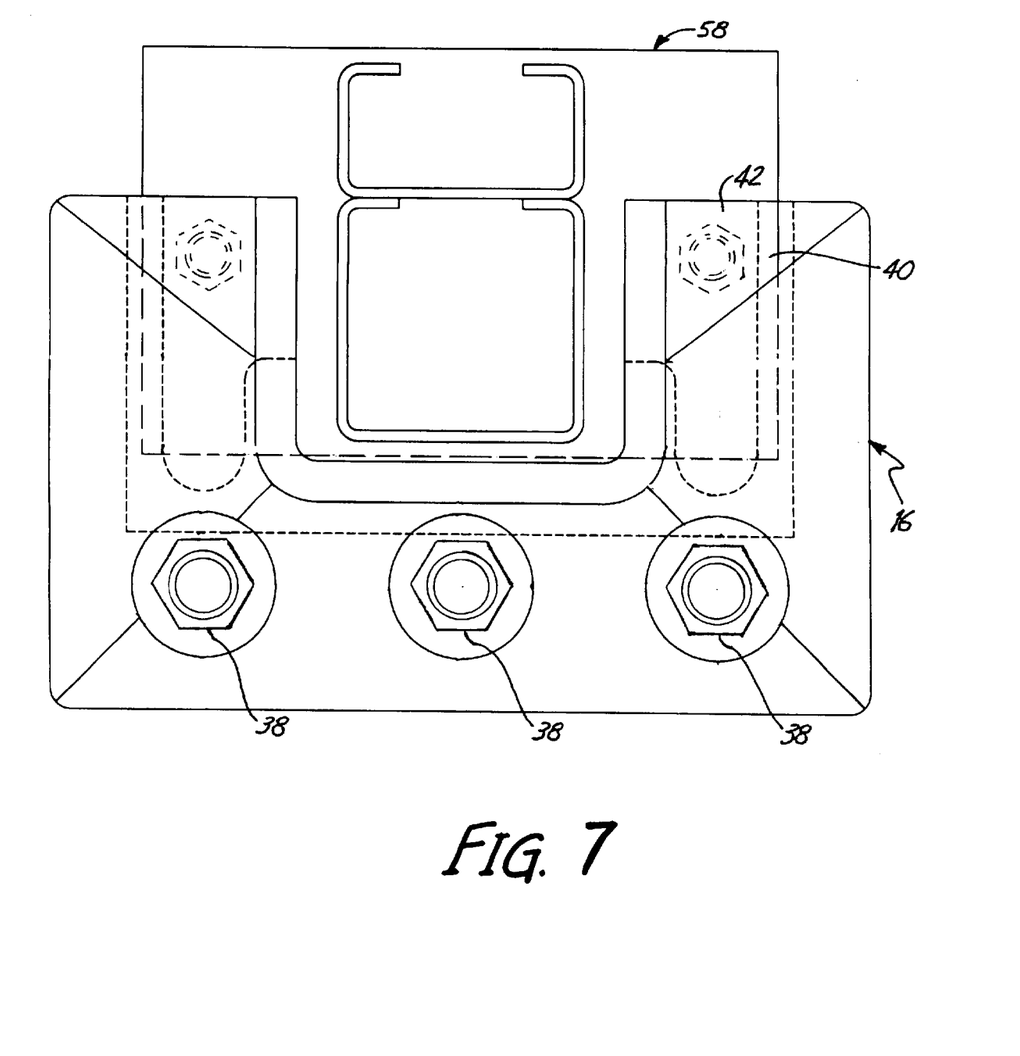
FIG. 7 is a top plan view of a column protector mounted to a rack double column with a 5×7 ¾ baseplate.

FIG. 7 shows a plan view of the bottom of the column protector 16 mounted to a double column baseplate 58. The column protector 16 is mounted onto a portion of the double column baseplate 58 by sliding the column protector 16 over the front of the double column baseplate 58. The first recessed portion 40 allows the column protector 16 to slide right over the double column baseplate 58.

Figure 8:
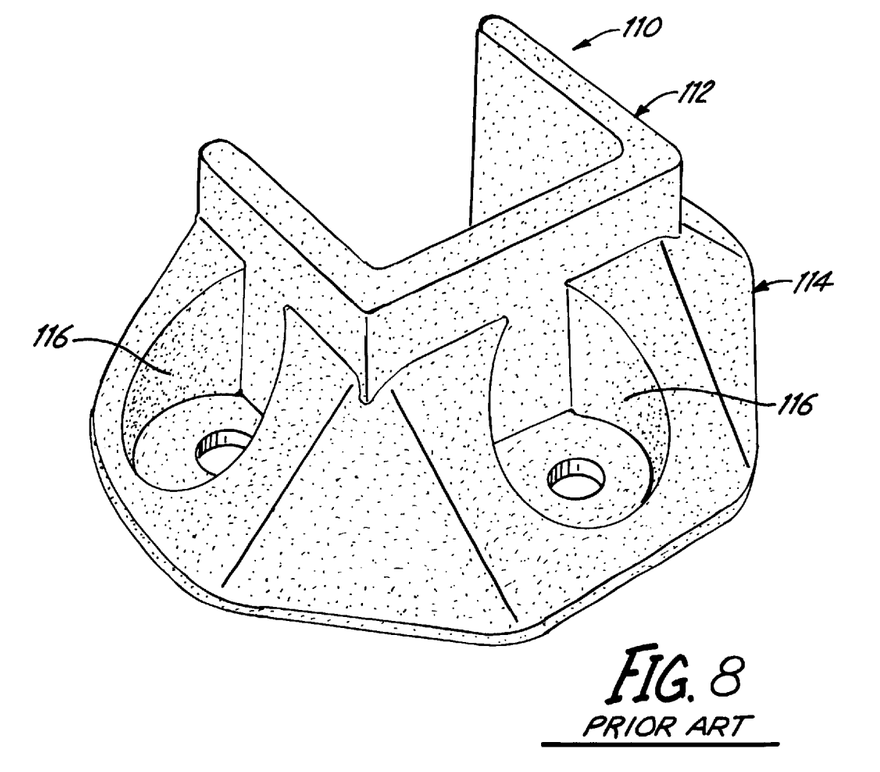
FIG. 8 is a top perspective view of a prior art column protector.
Figure 9:
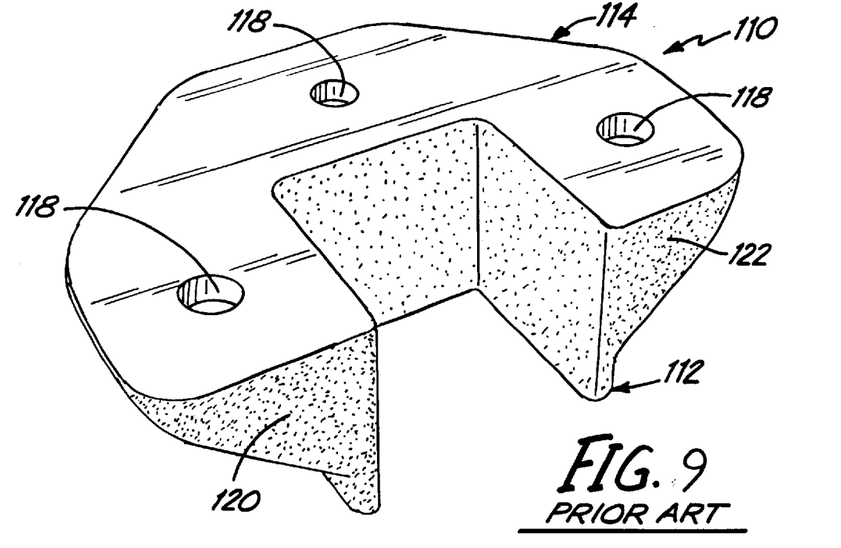
FIG. 9 is a bottom perspective view of the prior art column protector of FIG. 8.

FIGS. 8 and 9 show top and bottom perspective views of a prior art column protector 110. The prior art column protector 110 consists of a collar 112 and a foot 114. The foot 114 surrounds the collar 112 on three sides. The foot 114 includes a plurality of recessed pockets 116. The recessed pockets 116 are located to the left and right of the collar 112 as well as one forward of the collar 112. FIG. 9 shows the bottom view of the prior art column protector 110. The bottom is a level surface that includes three anchor reception openings 118. FIG. 9 also shows the back of the foot 114. The back includes a left flat section 120 and a right flat section 122.

Because the prior art column protector 110 does not have recessed portions on the bottom, it can only be mounted to a standard rack column baseplates. Therefore, the prior art column protector 110 does not have the same versatility, to be mounted onto various column baseplates, as the present invention. The prior art column protector 110 would be mounted around the base of a rack column to protect against fork lift damage. However, the prior art column 110 protects against front and side damage, but it does not have ramped back sides. Without the ramped back sides, pallets are prone to catch on the back side and be pulled off the forklift forks, or impact the rack column from the rear side causing damage to the rack column.

Although the present invention has been described with reference to preferred embodiments, workers skilled in the art will recognize that changes may be made in form and detail without departing from the spirit and scope of the invention.

What is claimed is:

1. A column protector for positioning at a base of a warehouse rack to protect a column of the rack from damage caused by a forklift, the column protector comprising:
   a collar having a u-shape with a first side, a second side and a third side for receiving a column of the rack; and
   a foot attached to the collar having:
      a left side that is ramped;
      a front that is ramped, wherein the front is located forward of the collar and includes a plurality of recessed pockets;
      a right side that is ramped;
      a left back side that is ramped;
      a right back side that is ramped;
      a first recessed portion located on the bottom of the foot that permits mounting the foot over a baseplate of a seismic rack column;
      a second recessed portion located on the bottom of the foot that permits mounting the foot over seismic rack column baseplate anchors; and a plurality of anchor reception openings for receiving anchors to secure the column protector to a concrete floor.

2. The column protector of claim 1, wherein the foot has three anchor reception openings.

3. The column protector of claim 2, wherein the anchor reception openings are aligned near an edge of the foot.

4. The column protector of claim 1, wherein the front has three recessed pockets.

5. The column protector of claim 4, wherein one of the recessed pockets is located at a junction with the left side.

6. The column protector of claim 4, wherein one of the recessed pockets is located at a junction with the right side.

7. The column protector of claim 1, wherein the column protector is ductile cast iron.

8. A column protector for positioning at a base of a warehouse rack to protect a column of the rack from damage caused by a forklift, the column protector comprising:
   a collar portion having a u-shape; and
   a foot attached to the collar having:
      a front that is ramped with a plurality of recessed pockets located forward of a sleeve portion;
      a bottom shaped to accommodate various baseplate shapes; and
      a plurality of anchor reception openings for receiving anchors to secure the column protector.

9. The column protector of claim 8, wherein the foot includes a left back side and a right back side that are ramped.

10. The column protector of claim 8, wherein the foot includes a left side and a right side that are ramped.

11. The column protector of claim 8, wherein the bottom has a first recessed portion that permits mounting over a baseplate of a seismic rack column.

12. The column protector of claim 8, wherein the bottom has a second recessed portion that permits mounting over seismic rack column baseplate anchors.

13. The column protector of claim 8, wherein the column protector is ductile cast iron.

14. A column protector for positioning at a base of a warehouse rack to protect a column of the rack from damage caused by a forklift, the column protector comprising:
   a collar having a u-shape; and
   a foot attached to the collar having:
      a left back side that is ramped;
      a right back side that is ramped; and
      a plurality of anchor reception openings for receiving anchors to secure the column protector to a concrete floor.

15. The column protector of claim 14 wherein the foot has a bottom that is shaped to fit over various baseplate shapes and baseplate anchors.

16. The column protector of claim 15 wherein the bottom comprises:
   a first recessed portion that permits mounting over a baseplate of a seismic rack column; and
   a second recessed portion that permits mounting over seismic rack column baseplate anchors.

17. The column protector of claim 16, wherein the foot has a left side, a front and a right side that are ramped.

18. The column protector of claim 17, wherein the front is located forward of the collar.

19. The column protector of claim 18, wherein the front includes a plurality of recessed pockets.

20. The column protector of claim 16, wherein the column protector is ductile cast iron.

21. A column protector for positioning at a base of a warehouse rack to protect a column of the rack from damage caused by a forklift, the column protector comprising:
   a collar; and
   a foot attached to the collar and having a bottom having a plurality a recesses shaped to fit over various baseplate shapes and baseplate anchors.

22. The column protector of claim 21 wherein the collar and the foot are a ductile cast iron casting.

* * * * *